United States Patent [19]
Bartmann et al.

[11] Patent Number: 4,959,403
[45] Date of Patent: Sep. 25, 1990

[54] THERMOPLASTIC MOLDING COMPOSITIONS WITH COLD IMPACT STRENGTH

[75] Inventors: Martin Bartmann, Recklinghausen; Roland Feinauer, Marl; Uwe Hartkopf, Haltern; Michael Schlobohm, Marl, all of Fed. Rep. of Germany

[73] Assignee: Huels Aktiengesellschaft, Marl, Fed. Rep. of Germany

[21] Appl. No.: 261,147

[22] Filed: Oct. 24, 1988

[30] Foreign Application Priority Data

Jan. 28, 1988 [DE] Fed. Rep. of Germany ....... 3805108

[51] Int. Cl.$^5$ ................................................ C08K 5/43
[52] U.S. Cl. ..................................... 524/169; 524/291
[58] Field of Search ................................. 524/169, 291

[56] References Cited

U.S. PATENT DOCUMENTS

| | | | |
|---|---|---|---|
| 2,214,405 | 9/1940 | Coffman | 524/168 |
| 2,491,934 | 12/1949 | Schlattman | 524/169 |
| 4,584,344 | 4/1986 | Baer | 525/66 |

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

A thermoplastic molding composition having good cold impact strength properties, consisting essentially of (I) a polyamide 1212 having a relative viscosity in the range of from 1.5 to 3.0, and (II) 2 to 25% by weight, based on the polyamide, of a plasticizer.

5 Claims, No Drawings

THERMOPLASTIC MOLDING COMPOSITIONS WITH COLD IMPACT STRENGTH

BACKGROUND OF THE INVENTION

1. Field of the Invention

The present invention relates to a thermoplastic molding composition having cold impact strength.

2. Discussion of the Background

The material property specifications which thermoplastic molding compositions must meet in the manufacture of, for example, transport pipelines are quite high. Such structures must be inert to the product being transported and must retain shape stability even under thermal stress. Lines that are used outdoors must withstand weathering. This means that they must essentially not lose their serviceability characteristics when subjected continually to solar radiation, atmospheric humidity, cold, and the like.

In general, all conventional polyamides (PA) are suitable for use in the manufacture of molded parts. Nevertheless, especially when polyamides are used outdoors, there are limitations. Thus, of the industrially used polyamides that have at least one monomer with $\leq 10$ carbon atoms in the carbon chain, none are known that are not strongly sensitive to water and humidity. The impact strength property, especially the cold impact strength, is a property which substantially deteriorates (Plastics Handbook, 19th Edition, C. Hanser Verlag—pages 294/295, Table).

More suitable are polyamides with a larger number of carbon atoms in the carbon chain, such as for example, PA 11 or PA 12, since they show increased stability to weathering and thus also improved cold impact strength. However, these industrially readily available higher polyamides, when used with plasticizers, suffer significant cold impact strength losses. Normally, an impact strength modifier is added to the polyamide in order to prevent loss of cold impact strength. strength as described, for instance, in DE-AS 2716004. However, one skilled in the art is then forced to work with a three-component system.

Another drawback of PA 11 or PA 12 is that because they are prepared from a lactam or the corresponding aminocarboxylic acid, the crude polymer naturally also contains monomer and oligomer that have to be removed from the product in an additional operating step.

Plasticizers and their use as an additive in polyamides are also known. A need therefore continues to exist for a polyamide molding composition which exhibits improved weathering characteristics.

SUMMARY OF THE INVENTION

Accordingly, one object of the present invention is to provide a molding composition based on a polyamide that does not lose its cold impact strength properties, even though it contains plasticizers, when it is subjected to weathering factors such as moisture.

Accordingly, this and other objects of the present invention as hereinafter will become more readily apparent can be attained by a thermoplastic molding composition having good impact strength which consists essentially of (I) a polyamide 1212 having a relative viscosity in the range from 1.5 to 3.0, and (II) from 2 to 25% by weight, based on the polyamide, of a plasticizer.

DETAILED DESCRIPTION OF THE PREFERRED EMBODIMENTS

Preferred PA 1212's are those which have a relative viscosity in the range of from 1.8 to 2.5. The preferred embodiment of the invention is a two-component system.

The designation of the polyamides as PA 1212 conforms to the international standard, in which the first digit(s) indicate(s) the number of carbon atoms in the starting amine and the last digit(s) indicate(s) the number of carbon atoms in the dicarboxylic acid. If only one number is specified, this means that the starting material was an aminocarboxylic acid or its lactam. (H. Domininghaus, Plastics and Their Properties, VDI-Verlag 1976, page 272).

A general review of plasticizers that are suitable for PA can be found in Gachter/Muller, Plastics Additives, Hanser Verlag, 2nd Edition, page 296. Suitable plasticizers for use with the polyamide include esters of p-hydroxybenzoic acid with 2 to 12 carbon atoms in the alcohol component and amides of arylsulfonic acids with 2 to 12 carbon atoms in the amine component, preferably amides of benzenesulfonic acid. Specific examples of plasticizers are ethyl p-hydroxybenzoate, octyl p-hydroxybenzoate, N-butyltoluenesulfonamide, N-octyltoluenesulfonamide, N-butylbenzenesulfonamide, N-2-ethylhexylbenzenesulfonamide. The preferred plasticizer is N-butylbenzenesulfonamide.

In the preferred range, the molding composition of the present invention contains 4 to 20 wt. % plasticizer based on the polyamide.

The polyamide PA 1212 is known as described by R. Vieweg/A. Muller in Plastics Handbook, Vol. 6 - Polyamide (C. Hanser Verlag, Munich 1966), p.187; Don. E. Floyd - Polyamide Resins, 2nd Edition (Chapmann Hall Verlag, New York/London, 1966), pp. 55 ff.).

In addition to the plasticizers, the molding composition of the present invention can also contain auxiliaries and additives such as stabilizers, pigments, fillers, and/or elasticizing agents. The molding composition of this invention can also be blended with other polyamides or polymers known for the purpose of forming polyamide blends, assuming that the desired properties achieved in the present invention are not impaired.

The molding compositions of the invention are prepared by the customary methods known in the art, for example by homogenizing the base polyamide, plasticizer, and optionally auxiliaries and additives in a double-shaft kneader, or by diffusing the plasticizer into the base polyamide granulate together with auxiliaries and additives soluble in the plasticizer.

The molding compositions of the invention show a number of unexpected desirable properties in comparison to other molding compositions based on PA known in the art. One advantage of the invention is that it is a two-component system. In comparison to PA which has a small number of carbon atoms, i.e., less than or equal to 10, in the starting monomers, molded parts are obtained with the invention that retain their good properties even under the action of weathering, especially in the cold. This also applies to plasticized PA where the polyamide has a large number of carbon atoms. Another advantage over PA 11 or PA 12 can be found in the fact that a PA is now available with which it is not necessary to extract monomers and low molecular weight fractions from the crude polymer in an additional operating step.

Having now generally described this invention, a further understanding can be obtained by reference to certain specific examples which are provided herein for purposes of illustration only and are not intended to be limiting unless otherwise specified.

The following properties of embodiments of the present polyamide based composition were determined by the procedures described.

The relative viscosity (eta$_{rel}$) of the PA is determined in m-cresol (0.5 g PA in 100 cm$^3$ of m-cresol) at 25° C. (DIN 53 727).

The cold impact strength of the molding compositions used in the Examples was measured on tubes having an outside diameter of 6.35 mm and a wall thickness of 1 mm. The tubes were prepared on a 20-D single-screw extruder having 3-zones with a bulk temperature of approximately 220 to 240° C. A portion of the tube is left untreated, a second portion is boiled for 2 hours in water, and a third portion is tempered for 24 hours at 110° C. in air in a heating oven. Ten each of the tempered, boiled, and untreated tubes are subjected to a cold impact strength test according to SAE J 844 at −40° C. The number of broken tubes is listed in the table below.

A given test identified with a letter is not within the scope of the present invention.

Preparation of PA 1212

42.8 parts by weight of 1,12-dodecanediamine (DA-12)/dodecanedioic acid (DDS) salt (prepared from 19.91 parts by weight of DA-12 and 22.89 parts by weight of DDS) and 0.05 parts by weight of DDS are placed in a pressure polycondensation vessel with an internal temperature of 160z° C. The vessel is then blanketed by alternately applying a vacuum and filling the vessel with nitrogen 5 times. A mixture of 4 parts by weight of water and 0.01 part by weight of H$_3$PO$_4$ is added to the vessel through a transfer tube and the mixture is then heated to an internal temperature of 220° C. with stirring over a period of 120 minutes, with a pressure of 19 bar being reached. The pressure is then continuously relieved over a period of 90 minutes, and the contents of the vessel are heated to an internal temperature of 260° C. After reaching the desired melt viscosity, the stirrer is stopped, nitrogen gauge pressure of 20 bar is applied, and after standing for 30 minutes the PA 1212 (eta$_{rel.}$ = 1.89) is run out using a spinning pump, and is granulated in a water bath after cooling.

To adjust the eta$_{rel.}$ value to 2.15, the PA 1212 is post-condensed in the solid phase at 170° C.

Preparation of PA 12

The preparation is carried out according to Example 1 of DE-PS 21 52 194. To reach the final level of the eta$_{rel}$ value, the PA 12 is post-condensed.

Preparation of the Molding Composition 100 parts by weight of polyamide, one part by weight of N,N'-hexamethylenebis(3,5-di-t-butyl-4-hydroxy)-dihydrocinnamamide, and the amount of plasticizer listed in the table are homogenized in a double-screw extruder, granulated, and dried to a residual moisture content of <0.05 wt. %.

TABLE

| Experiment No. | Polyamide | Viscosity (DIN 53 727) | Plasticizer Type[1] | Plasticizer Amount[2] | Cold Impact Untreated | Test (−40° C.)[3] After boiling | Test (−40° C.)[3] After tempering |
|---|---|---|---|---|---|---|---|
| 1 | 1212 | 1.89 | BBSA | 14 | 0 | 1 | 0 |
| 2 | 1212 | 2.15 | BBSA | 14 | 0 | 0 | 0 |
| 3 | 1212 | 2.15 | EHBA | 14 | 0 | 0 | 1 |
| 4 | 1212 | 1.89 | BBSA | 7 | 0 | 0 | 0 |
| A | 12 | 2.15 | BBSA | 14 | 6 | 9 | 7 |

[1]Plasticizers:
BBSA: N-Butylbenzenesulfonamide
EHBA: N-2-Ethylhexylbenzenesulfonamide
[2]Parts by weight of plasticizer/100 parts by weight of PA
[3]The number of broken tubes is specified

Having now fully described the invention, it will be apparent to one of ordinary skill in the art that many changes and modifications can be made thereto without departing from the spirit or scope of the invention as set forth herein.

We claim:

1. A thermoplastic molding composition having good cold impact strength properties, consisting essentially of:
   (I) a polyamide 1212 having a relative viscosity, as determined by a m-cresol solution (100 cm$^3$) containing 0.5 g PA 1212 at 25° C., in the range of from 1.5 to 3.0, and
   (II) 2 to 25% by weight, based on the polyamide, of a plasticizer.

2. The molding composition of claim 1, wherein said polyamide 1212 has a relative viscosity in the range from 1.8 to 2.5.

3. The molding composition of claim 1 or 2, wherein the plasticizer content ranges from 4 to 20% by weight, based on the weight of polyamide.

4. The molding composition of claim 1, wherein said plasticizer is ethyl p-hydroxybenzoate, octyl p-hydroxybenzoate, N-butyltoluenesulfonamide, N-octyltoluenesulfonamide, N-butylbenzenesulfonamide, or N-2-ethylhexylbenzenesulfonamide.

5. A thermoplastic molding composition having good cold impact strength properties, consisting essentially of:
   (I) a polyamide 1212 having a relative viscosity, as determined by a m-cresol solution (100cm$^3$) containing 0.5 g PA 1212 at 25° C., in the range of from 1.5 to 3.0, and
   (II) 2 to 25% by weight, based on the polyamide, of a plasticizer selected from the group consisting of ethyl p-hydroxybenzoate, octyl p-hydroxybenzoate, N-butyltoluenesulfonamide, N-octyltoluenesulfonamide, N-butylbenzenesulfonamide, and N-2-ethylhexylbenzenesulfonamide.

* * * * *

UNITED STATES PATENT AND TRADEMARK OFFICE
CERTIFICATE OF CORRECTION

PATENT NO. : 4,959,403
DATED : SEPTEMBER 25, 1990
INVENTOR(S) : MARTIN BARTMANN ET AL.

It is certified that error appears in the above-identified patent and that said Letters Patent is hereby corrected as shown below: Title page:

In the Foreign Application Priority Data, please delete "3805108" and insert --3802510.8--.

Signed and Sealed this

Fourth Day of February, 1992

Attest:

HARRY F. MANBECK, JR.

*Attesting Officer*      *Commissioner of Patents and Trademarks*